(12) United States Patent
Kayano et al.

(10) Patent No.: US 9,941,760 B2
(45) Date of Patent: Apr. 10, 2018

(54) ROTARY ELECTRIC MACHINE

(71) Applicant: Mitsubishi Electric Corporation, Chiyoda-ku, Tokyo (JP)

(72) Inventors: Shinsuke Kayano, Chiyoda-ku (JP); Masaya Inoue, Chiyoda-ky (JP); Masashi Nakamura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 505 days.

(21) Appl. No.: 14/504,733

(22) Filed: Oct. 2, 2014

(65) Prior Publication Data

US 2015/0280507 A1    Oct. 1, 2015

(30) Foreign Application Priority Data

Mar. 28, 2014    (JP) ................. 2014-068096

(51) Int. Cl.
*H02K 3/28* (2006.01)
*H02K 9/19* (2006.01)
*H02K 3/50* (2006.01)
*H02K 9/06* (2006.01)

(52) U.S. Cl.
CPC .............. *H02K 3/28* (2013.01); *H02K 3/505* (2013.01); *H02K 9/19* (2013.01); *H02K 9/06* (2013.01)

(58) Field of Classification Search
CPC .. H02K 3/12; H02K 3/18; H02K 3/28; H02K 3/34; H02K 3/50; H02K 3/505; H02K 9/06; H02K 9/19

USPC ................. 310/179, 180, 184, 198
See application file for complete search history.

(56) References Cited

U.S. PATENT DOCUMENTS

| | | | | |
|---|---|---|---|---|
| 5,864,192 A * | 1/1999 | Nagate | ............ | H02K 11/01 310/156.05 |
| 6,121,711 A * | 9/2000 | Nakahara | .......... | H02K 1/14 242/432.3 |
| 6,373,163 B1* | 4/2002 | Oohashi | ............ | H02K 3/12 310/184 |
| 7,408,281 B2* | 8/2008 | Kinashi | ............ | H02K 21/16 310/180 |
| 7,683,518 B2* | 3/2010 | Yoshikawa | ...... | H02K 1/276 310/156.53 |
| 7,960,878 B2* | 6/2011 | Ishizuka | .......... | H02K 9/19 310/179 |
| 2009/0179518 A1* | 7/2009 | Tajima | ............ | H02K 1/2766 310/216.055 |

FOREIGN PATENT DOCUMENTS

JP    5233441 B2    7/2013

* cited by examiner

*Primary Examiner* — Tran Nguyen
(74) *Attorney, Agent, or Firm* — Sughrue Mion, PLLC; Richard C. Turner

(57) ABSTRACT

Conductor terminals of a plurality of conductor wires that constitute a stator winding each extend outward at a first axial end of a stator core, and among the conductor terminals, conductor terminals through which same-phase electric power flows are respectively connected by crossover wires, and circumferential regions that are occupied by the crossover wires are separated from each other in a circumferential direction.

7 Claims, 11 Drawing Sheets

ROTARY ELECTRIC MACHINE

BACKGROUND OF THE INVENTION

1. Field of the Invention

The present invention relates to a rotary electric machine such as an electric motor or a generator, for example, and particularly relates to a construction of crossover wires that connect together conductor terminals of conductor wires of a stator winding.

2. Description of the Related Art

In motors that are used in electric vehicles (EVs), hybrid electric vehicles (HEVs), etc., temperatures inside the motors rise easily because large currents are passed through stator windings. Since temperature increases inside a motor lead to increases in motor loss, deterioration in the service life of component parts, etc., constructions that have superior cooling are desirable.

In consideration of such conditions, in conventional rotary electric machines, transition parts (corresponding to crossover wires in the present application) that connect together end portions of respective phase windings are configured such that circumferential regions that are occupied by the transition parts overlap with each other in a circumferential direction (see Patent Literature 1, for example).

CITATION LIST

Patent Literature

[Patent Literature 1] Japanese Patent No. 5233441 (Gazette)

SUMMARY OF THE INVENTION

In Patent Literature 1, because the circumferential regions that are occupied by the transition parts overlap with each other in the circumferential direction, air passages are reduced inside groups of transition parts. Thus, one problem has been that heat is confined inside a stator, raising the temperature of a rotor. In permanent-magnet rotary electric machines, temperature increases in the rotor lead to demagnetization of the permanent magnets.

The present invention aims to solve the above problems and an object of the present invention is to provide a rotary electric machine that can suppress temperature increases in a rotor that result from heat being confined inside a stator, by configuring crossover wires that connect together conductor terminals through which same-phase electric power flows such that circumferential regions that are occupied by the crossover wires are separated from each other in a circumferential direction.

In order to achieve the above object, according to one aspect of the present invention, there is provided a rotary electric machine including: a rotor that has a plurality of magnetic poles that differ alternately in a circumferential direction; an annular stator core that faces the rotor on an inner circumferential side or an outer circumferential side, and on which slots that have a slot depth direction in a radial direction are arranged circumferentially; and a stator winding that is constituted by a plurality of conducting wires that are each wound onto the stator core so as to pass through the slots. Conductor terminals of the plurality of conductor wires each extend outward at a first axial end of the stator core, and among the conductor terminals, conductor terminals through which same-phase electric power flows are respectively connected by crossover wires, and circumferential regions that are occupied by the crossover wires are separated from each other in a circumferential direction.

According to the present invention, because circumferential regions that are occupied by the crossover wires are separated from each other in a circumferential direction, air passages are increased in groups of the crossover wires. Cooling of the stator is thereby improved, suppressing temperature increases in the stator. Because heat is less likely to be confined inside the stator, the rotor and external air can exchange heat efficiently, suppressing temperature increases in the rotor.

DETAILED DESCRIPTION OF THE PREFERRED EMBODIMENTS

Preferred embodiments of a rotary electric machine according to the present invention will now be explained with reference to the drawings.

Embodiment 1

Figure 1:
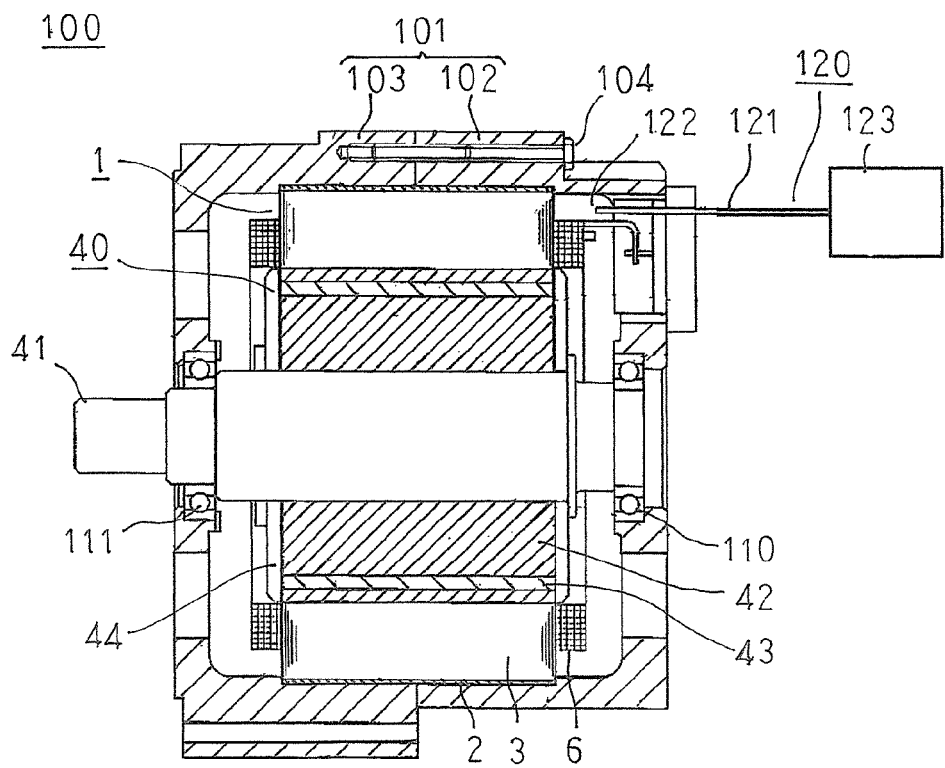
FIG. 1 is a cross section that shows a rotary electric machine according to Embodiment 1 of the present invention.
Figure 2:
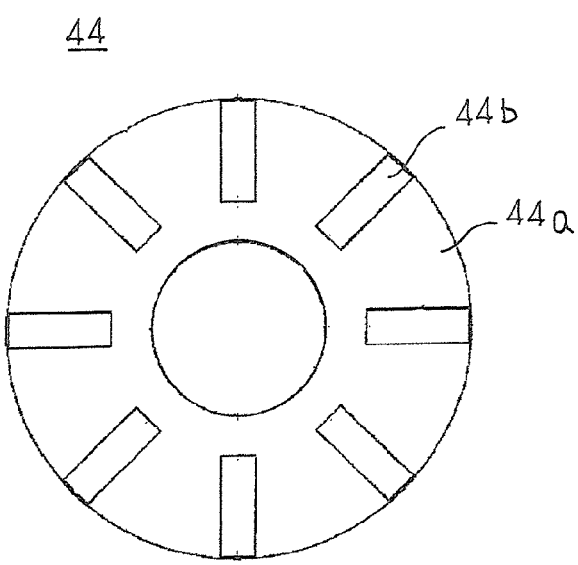
FIG. 2 is a front elevation that shows a cooling fan that is mounted onto a rotor of the rotary electric machine according to Embodiment 1 of the present invention.
Figure 3:
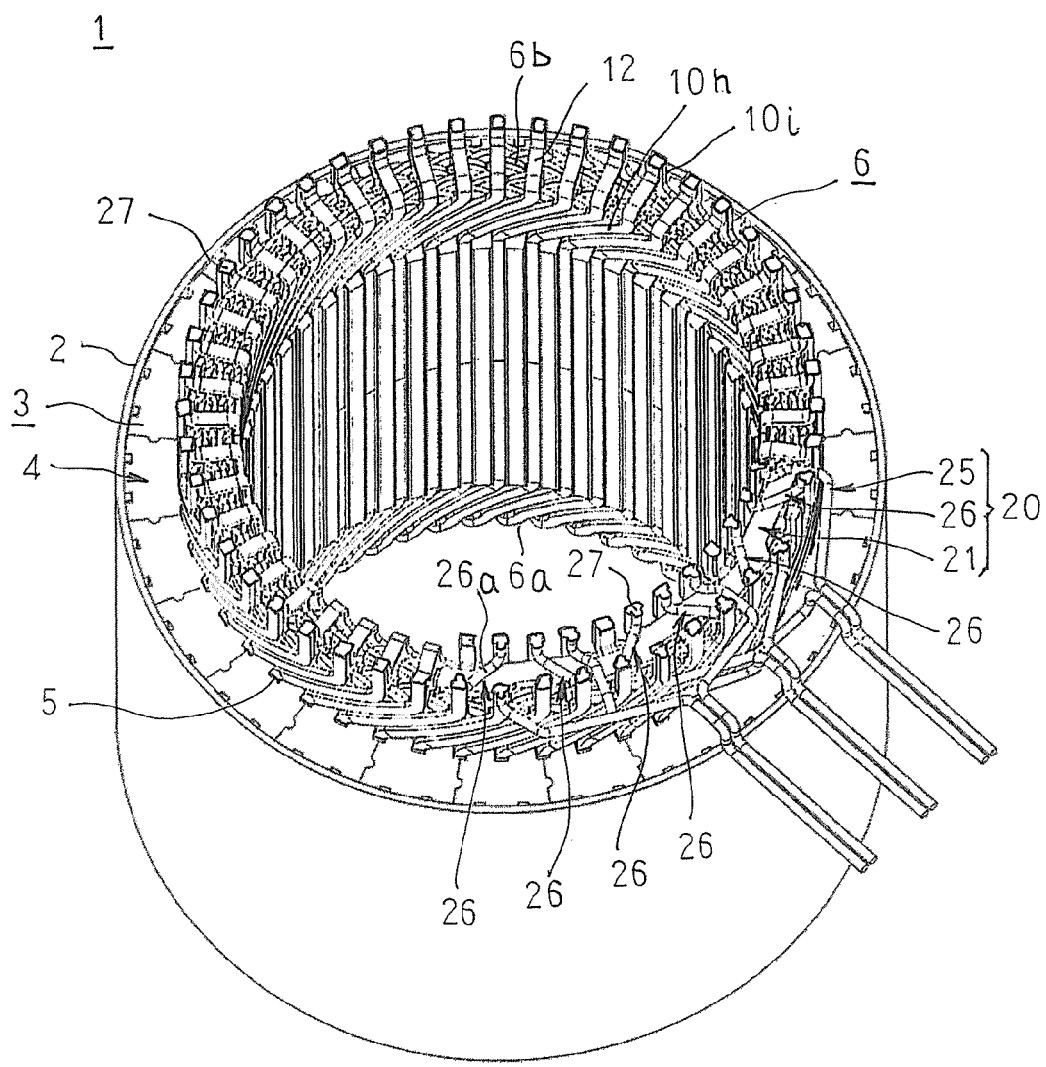
FIG. 3 is an oblique projection that shows the rotary electric machine stator according to Embodiment 1 of the present invention.
Figure 4:
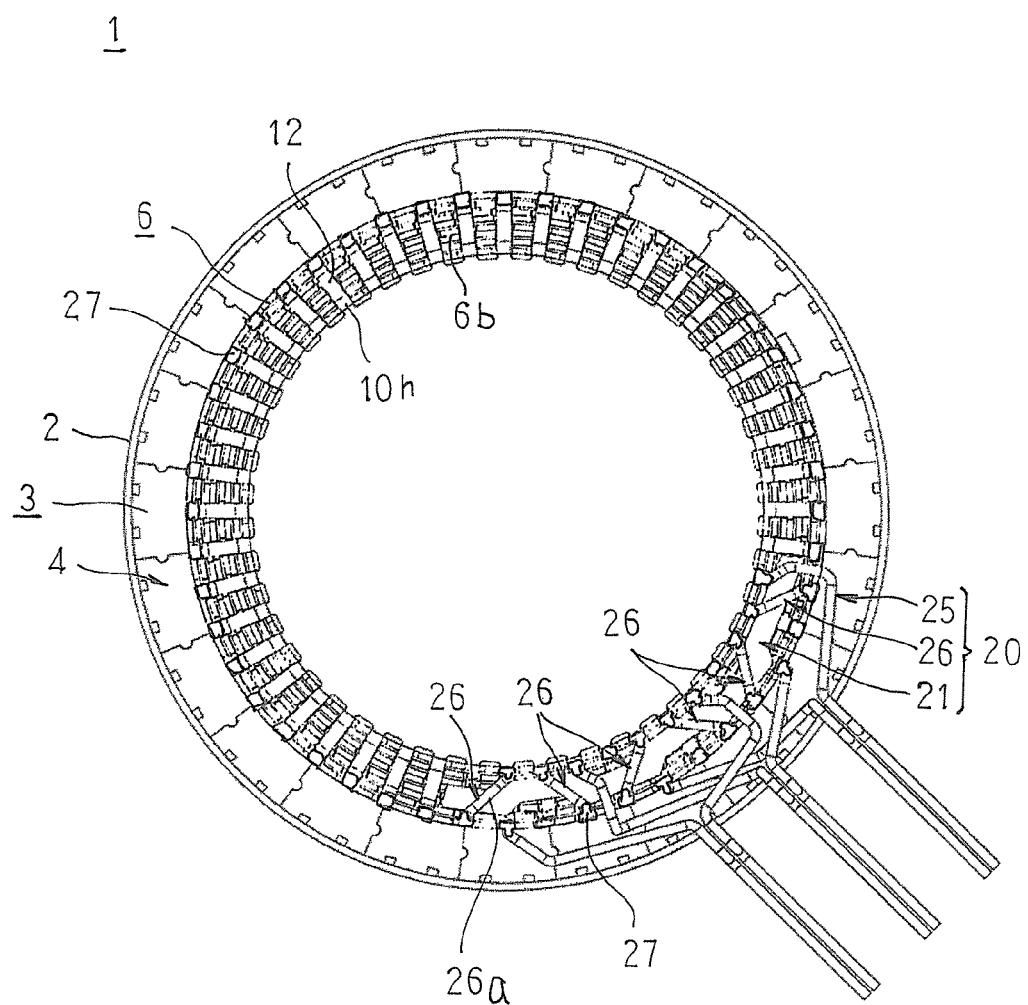
FIG. 4 is an end elevation that shows the rotary electric machine stator according to Embodiment 1 of the present invention.
Figure 5:
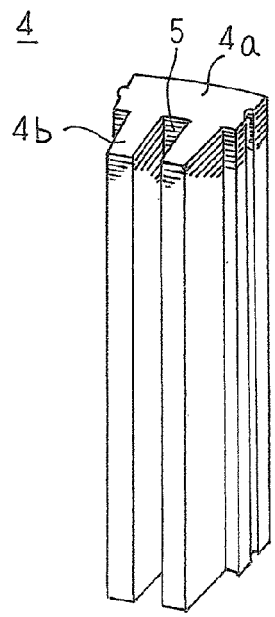
FIG. 5 is an oblique projection that shows a core block that constitutes a stator core in the rotary electric machine stator according to Embodiment 1 of the present invention.
Figure 6:
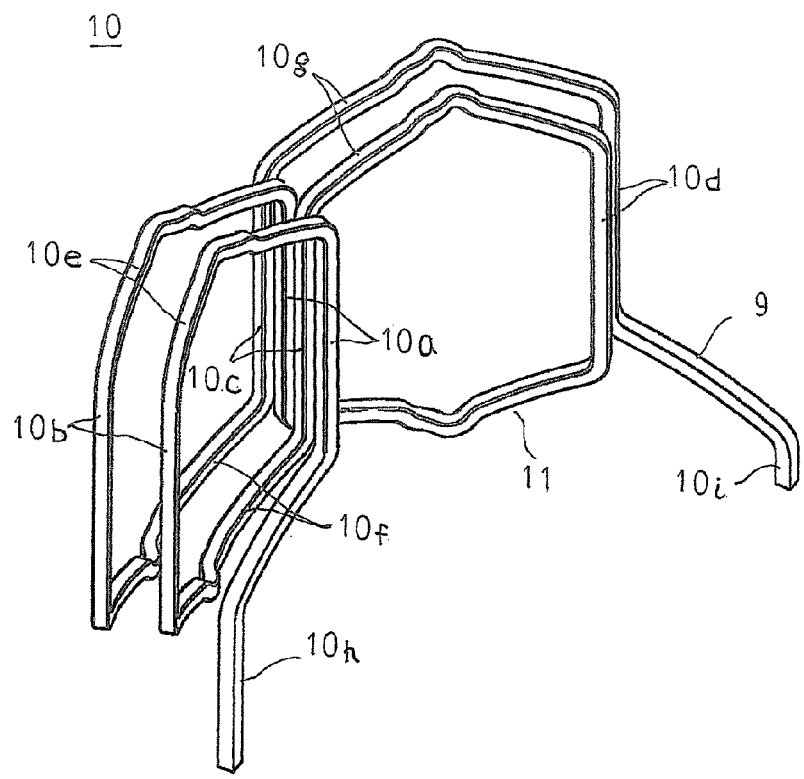
FIG. 6 is an oblique projection that shows a winding body that constitutes a stator winding in the rotary electric machine stator according to Embodiment 1 of the present invention.
Figure 7:
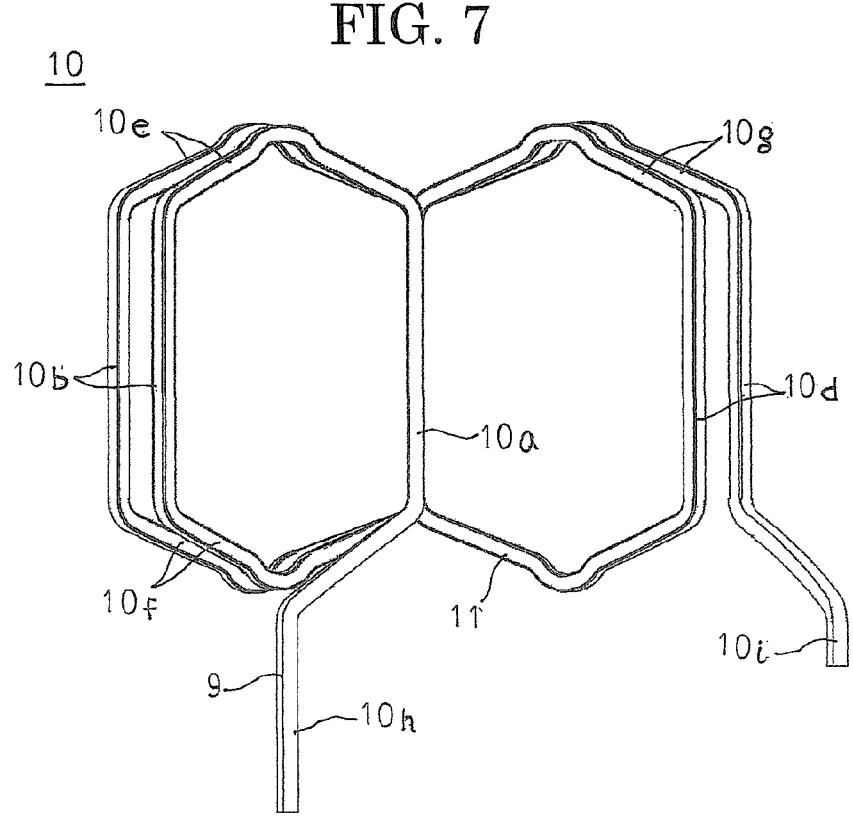
FIG. 7 is a front elevation that shows a winding body that constitutes a stator winding in the rotary electric machine stator according to Embodiment 1 of the present invention.
Figure 8:
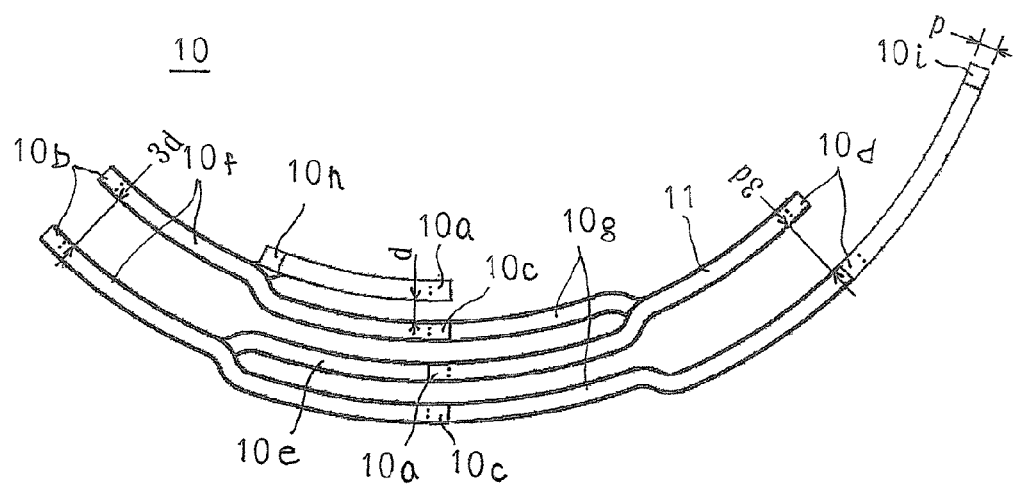
FIG. 8 is an end elevation that shows a winding body that constitutes a stator winding in the rotary electric machine stator according to Embodiment 1 of the present invention viewed from a side near second coil ends.
Figure 9:
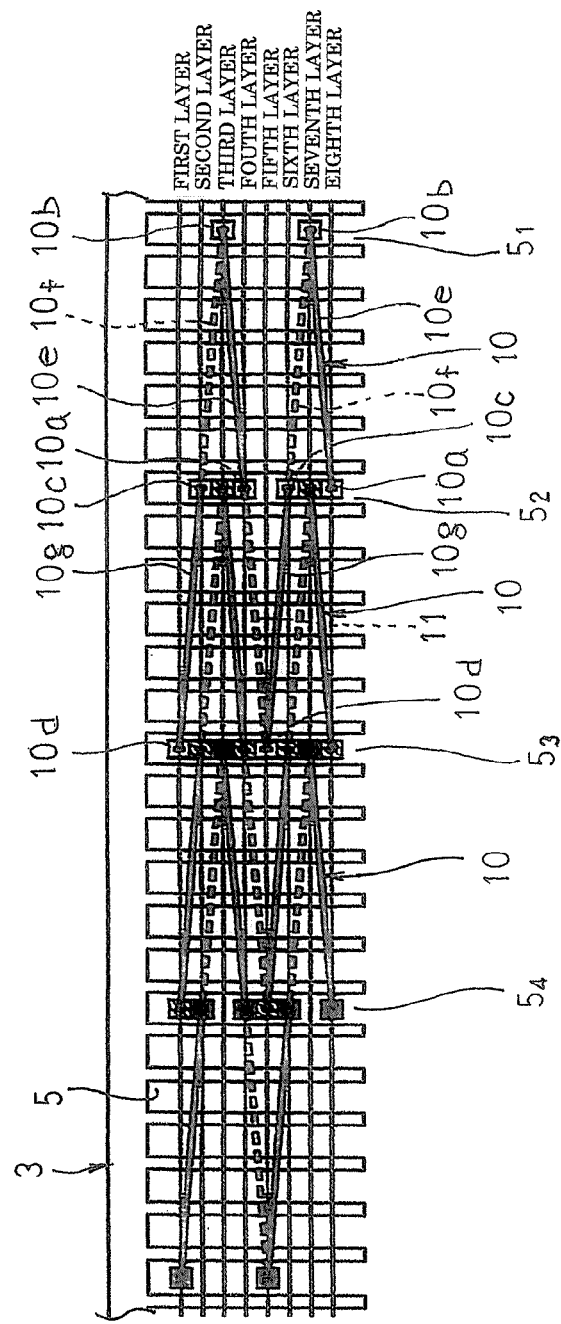
FIG. 9 is a partial end elevation that shows a state in which three winding bodies that constitute the stator winding in the rotary electric machine stator according to Embodiment 1 of the present invention are mounted into the stator core so as to share a single slot viewed from a side near second coil ends.
Figure 10:
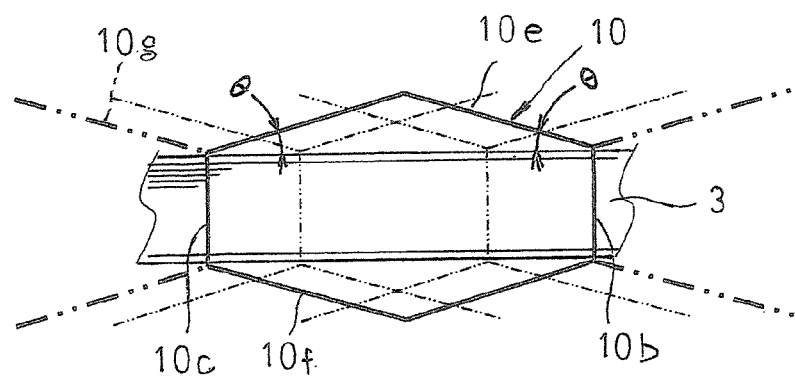
FIG. 10 is a developed projection that shows a winding body that is mounted onto the stator core in the rotary electric machine stator according to Embodiment 1 of the present invention viewed from radially outside.
Figure 11:
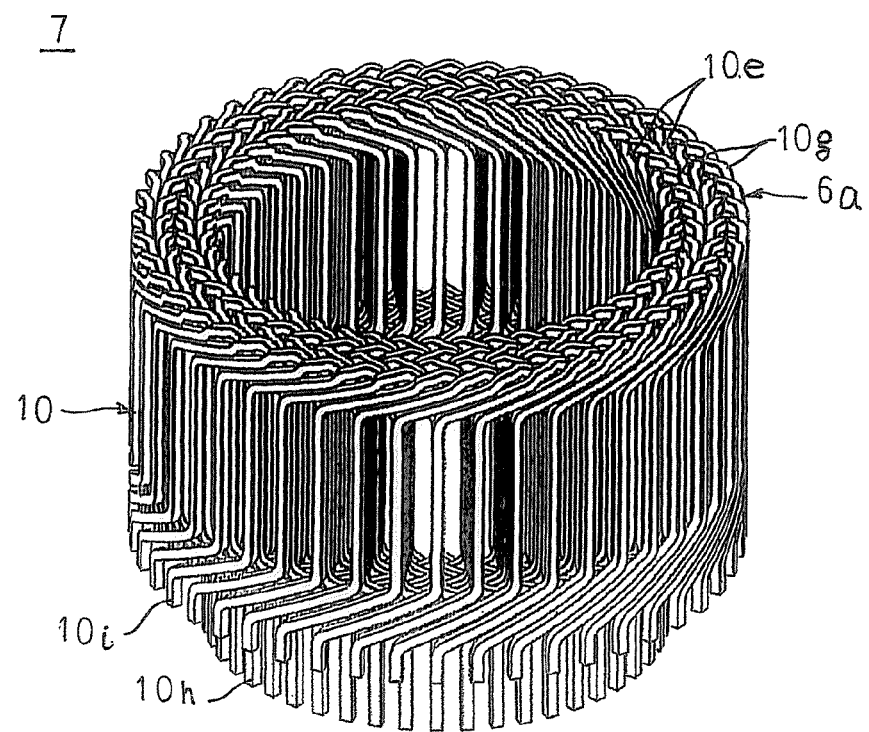
FIG. 11 is an oblique projection that shows a winding assembly that constitutes a stator winding in the rotary electric machine stator according to Embodiment 1 of the present invention.
Figure 12:
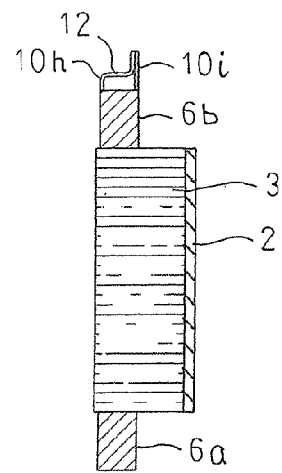
FIG. 12 is a partial cross section that explains joining of the winding bodies in the rotary electric machine stator according to Embodiment 1 of the present invention.
Figure 13:
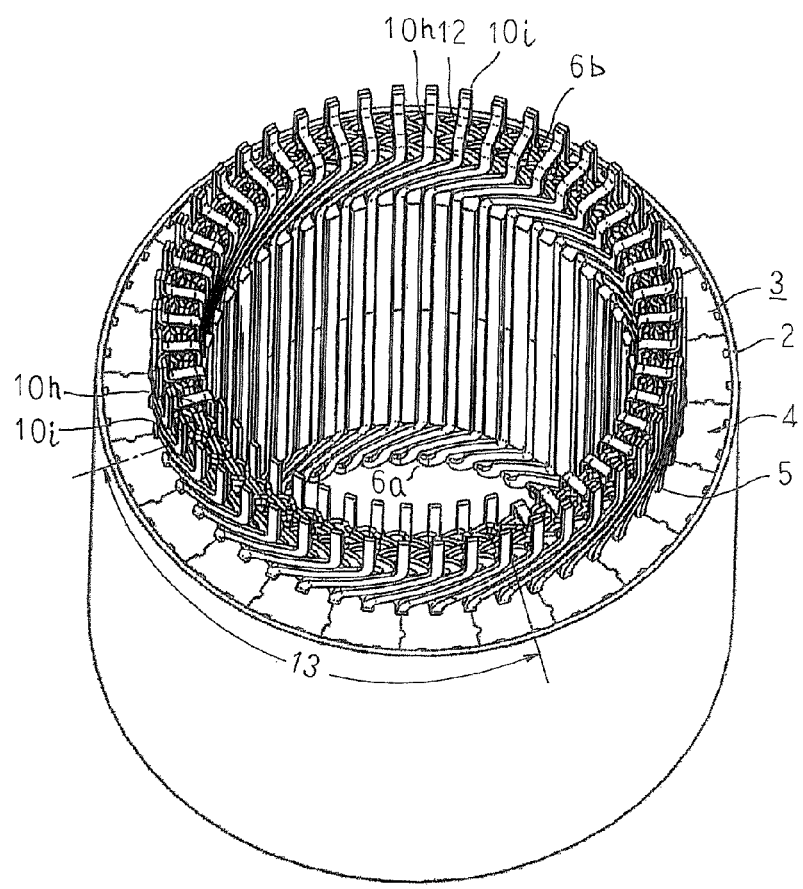
FIG. 13 is an oblique projection that shows a state in which a winding assembly that constitutes a stator winding is mounted onto the stator core in the rotary electric machine stator according to Embodiment 1 of the present invention.
Figure 14:
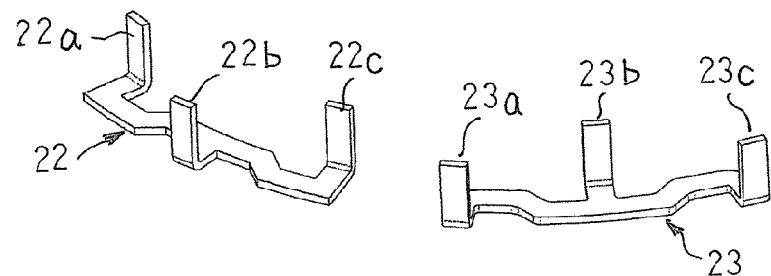
FIG. 14 is an oblique projection that shows first and second neutral point connecting busbars in the rotary electric machine stator according to Embodiment 1 of the present invention.
Figure 15:
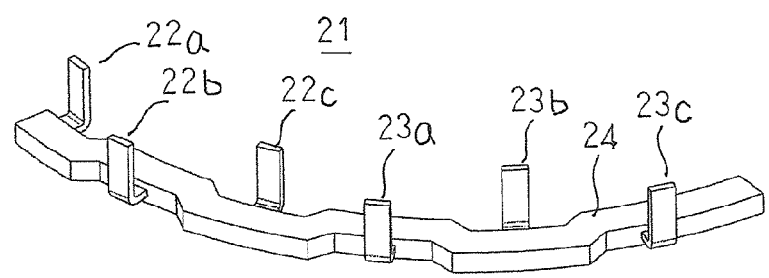
FIG. 15 is an oblique projection that shows a neutral point connecting plate in the rotary electric machine stator according to Embodiment 1 of the present invention.
Figure 16:
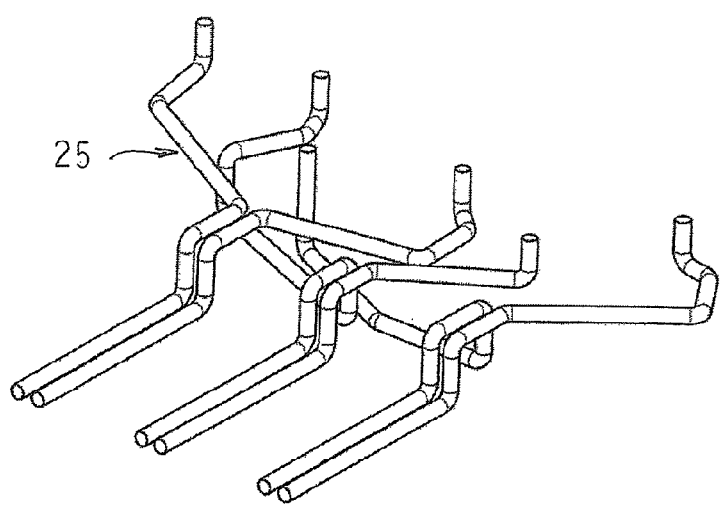
FIG. 16 is an oblique projection that shows electric power supply coils in the rotary electric machine stator according to Embodiment 1 of the present invention.
Figure 17:
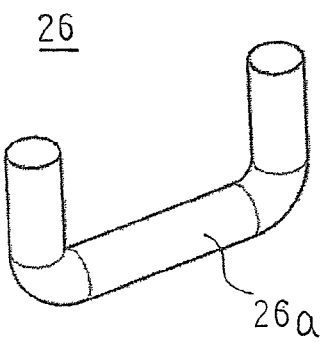
FIG. 17 is an oblique projection that shows a crossover wire in the rotary electric machine stator according to Embodiment 1 of the present invention.
Figure 18:
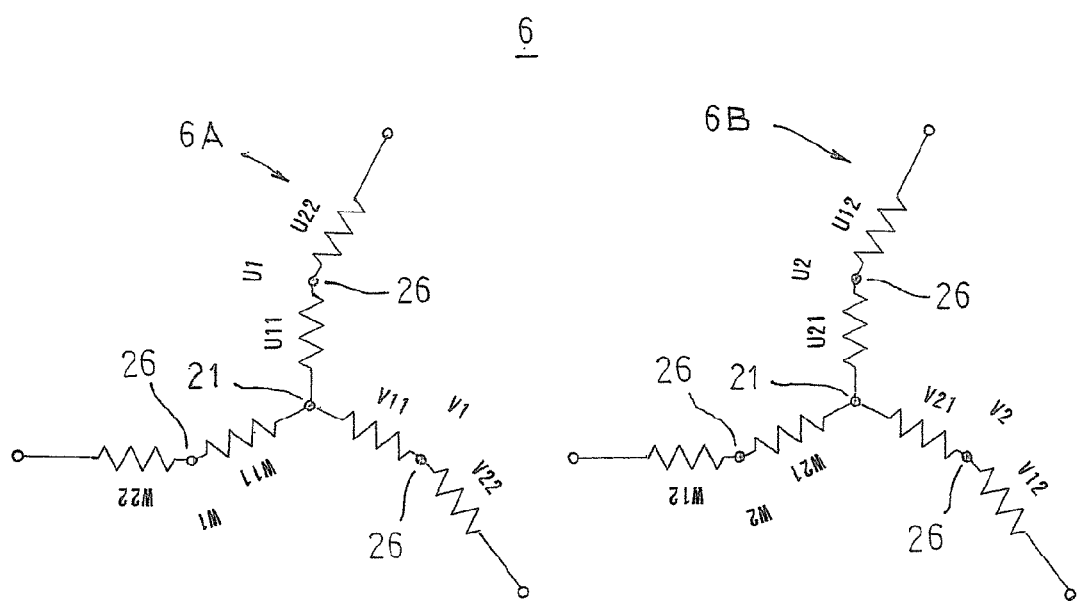
FIG. 18 shows connection diagrams for the stator winding in the rotary electric machine stator according to Embodiment 1 of the present invention.

FIG. 1 is a cross section that shows a rotary electric machine according to Embodiment 1 of the present invention, FIG. 2 is a front elevation that shows a cooling fan that is mounted onto a rotor of the rotary electric machine according to Embodiment 1 of the present invention, FIG. 3 is an oblique projection that shows the rotary electric machine stator according to Embodiment 1 of the present invention, FIG. 4 is an end elevation that shows the rotary electric machine stator according to Embodiment 1 of the present invention, FIG. 5 is an oblique projection that shows a core block that constitutes a stator core in the rotary electric machine stator according to Embodiment 1 of the present invention, FIG. 6 is an oblique projection that shows a winding body that constitutes a stator winding in the rotary electric machine stator according to Embodiment 1 of the present invention, FIG. 7 is a front elevation that shows a winding body that constitutes a stator winding in the rotary electric machine stator according to Embodiment 1 of the present invention, FIG. 8 is an end elevation that shows a winding body that constitutes a stator winding in the rotary electric machine stator according to Embodiment 1 of the present invention viewed from a side near second coil ends, FIG. 9 is a partial end elevation that shows a state in which three winding bodies that constitute the stator winding in the rotary electric machine stator according to Embodiment 1 of the present invention are mounted into the stator core so as to share a single slot viewed from a side near second coil ends, FIG. 10 is a developed projection that shows a winding body that is mounted onto the stator core in the rotary electric machine stator according to Embodiment 1 of the present invention viewed from radially outside, FIG. 11 is an oblique projection that shows a winding assembly that constitutes a stator winding in the rotary electric machine stator according to Embodiment 1 of the present invention, FIG. 12 is a partial cross section that explains joining of the winding bodies in the rotary electric machine stator according to Embodiment 1 of the present invention, FIG. 13 is an oblique projection that shows a state in which a winding assembly that constitutes a stator winding is mounted onto the stator core in the rotary electric machine stator according to Embodiment 1 of the present invention, FIG. 14 is an oblique projection that shows first and second neutral point connecting busbars in the rotary electric machine stator according to Embodiment 1 of the present invention, FIG. 15 is an oblique projection that shows a neutral point connecting plate in the rotary electric machine stator according to Embodiment 1 of the present invention, FIG. 16 is an oblique projection that shows electric power supply coils in the rotary electric machine stator according to Embodiment 1 of the present invention, FIG. 17 is an oblique projection that shows a crossover wire in the rotary electric machine stator according to Embodiment 1 of the present invention, and FIG. 18 shows connection diagrams for the stator winding in the rotary electric machine stator according to Embodiment 1 of the present invention.

In FIG. 1, a rotary electric machine 100 includes: a housing 101 in which a pair of housing members 102 and 103 that have approximately floored cylindrical shapes are integrated by fastening using a bolt 104 such that opening portions are abutted together; a rotor 40 that is fixed to a rotating shaft 41 that is rotatably supported in the housing 101 by means of bearings 110 and 111; and a stator 1 that is fixed to the housing 101 inside the housing 101 so as to surround the rotor 40. The rotary electric machine 100 also has a cooling liquid supplying apparatus 120 that includes: a pipeline 121 that communicates between an external portion and an internal portion of the housing 101, and on an end of which a discharging orifice 122 that discharges cooling liquid has an opening; and a pump 123 that supplies a cooling liquid such as an automatic transmission fluid (ATF) to the pipeline 121.

The rotor 40 includes: a rotor core 42 that is fixed to the rotating shaft 41, which is inserted into a central position thereof; permanent magnets 43 that are embedded near an outer circumferential surface of the rotor core 42 so as to be arranged at a predetermined pitch circumferentially to constitute magnetic poles; and cooling fans 44. As shown in FIG. 2, the cooling fans 44 include: a flat ring-shaped base portion 44a; and a plurality of blades 44b that are disposed on a front surface of the base portion 44a at a uniform angular pitch circumferentially, the cooling fans 44 being fixed to two axial end surfaces of the rotor core 42 such that rear surfaces of the base portions 44a face toward the rotor core 42. In this case, the rotor 40 has eight magnetic poles that differ alternately in a circumferential direction.

Configuration of the stator 1 will now be explained with reference to FIGS. 3 through 18.

As shown in FIGS. 3 and 4, the stator 1 includes: an annular stator core 3; a stator winding 6 that is mounted onto the stator core 3; and a connecting member 20 that connects the stator winding 6. Here, to facilitate explanation, the number of slots in the stator core 3 is forty-eight, and the stator winding is a three-phase winding. Furthermore, slots 5 are formed on the stator core 3 at a ratio of two slots per phase per pole.

As shown in FIG. 5, core blocks 4 are configured by dividing the annular stator core 3 into twenty-four equal sections circumferentially, are produced by laminating and integrating thin electromagnetic steel sheets, and include: a core back portion 4a that has a circular arc-shaped cross section; and two teeth 4b that each project radially inward from an inner circumferential wall surface of the core back portion 12a so as to be separated in a circumferential direction. The stator core 3 is produced by arranging twenty-four core blocks 4 into an annular shape circumferentially by abutting together circumferential side surfaces of the core back portion 4a such that the teeth 4b are oriented radially inward, and integrating them by shrink-fitting, press-fitting, etc., them into a cylindrical frame 2. The slots 5, which are formed by the core back portions 4a and the teeth 4b, are arranged in a row at a uniform angular pitch circumferentially so as to be open on an inner circumferential side.

The stator winding 6 includes forty-eight winding bodies 10 that are disposed at a pitch of one slot circumferentially around the stator core 3.

The winding bodies 10 are distributed windings that are produced by winding into edgewise windings conductor wires 9 that are made of jointless continuous rectangular copper wire that is insulated using an enamel resin, for example. Specifically, as shown in FIGS. 6 through 8, the winding bodies 10 are configured such that two δ-shaped coil patterns that are constituted by a first rectilinear portion 10a, a first coil end portion 10e, a second rectilinear portion 10b, a second coil end portion 10f, a third rectilinear portion 10c, a third coil end portion 10g, and a fourth rectilinear portion 10d are arranged in a longitudinal direction of short sides of the rectangular cross sections of the conductor wires 9, and the fourth rectilinear portion 10d and the first rectilinear portion 10a are linked using a linking wire 11. The linking wires 11 constitute coil end portions, winding start end portions of the conductor wires 9 constitute winding ends 10h that function as first conductor terminals, and winding finish end portions constitute winding ends 10i that function as second conductor terminals.

In winding bodies 10 that are configured in this manner, four first rectilinear portions 10a and third rectilinear portions 10c are arranged in a single column such that longitudinal directions of long sides of the rectangular cross sections are oriented in a circumferential direction so as to leave gaps d in the longitudinal direction of the short sides of the rectangular cross sections. Two second rectilinear portions 10b are arranged so as to be separated by an angular pitch of six slots in a first circumferential direction from the column of the first rectilinear portions 10a and the third rectilinear portions 10c such that longitudinal directions of long sides of the rectangular cross sections are oriented in a circumferential direction so as to leave a gap 3d in the longitudinal direction of the short sides of the rectangular cross sections. Two fourth rectilinear portions 10d are arranged so as to be separated by an angular pitch of six slots in a second circumferential direction from the column of the first rectilinear portions 10a and the third rectilinear portions 10c such that longitudinal directions of long sides of the rectangular cross sections are oriented in a circumferential direction so as to leave a gap 3d in the longitudinal direction of the short sides of the rectangular cross sections. Moreover, an angular pitch of six slots is a pitch between slot centers of slots 5 on two sides of six consecutive teeth 4b, and corresponds to a pitch of one magnetic pole. Furthermore, d is a length of the short sides of the rectangular cross sections of the conductor wires 9, in other words, a wire thickness.

FIG. 9 shows a state in which three winding bodies 10 are each mounted into the stator core 3 so as to share one slot 5. FIG. 10 shows the state in which the winding bodies 10 are mounted into the stator core when viewed from radially outside. In FIG. 9, four slots 5 that line up at an angular pitch of six slots circumferentially will be designated a first slot $5_1$, a second slot $5_2$, a third slot $5_3$, and a fourth slot $5_4$, in order circumferentially.

In FIGS. 9 and 10, focusing on one winding body 10, a first coil end portion 10e that extends outward at a second axial end from a first rectilinear portion 10a in a first layer from a slot opening side of the second slot $5_2$ (a radially innermost position) extends toward the first slot $5_1$ circumferentially at an angle of inclination θ, changes lanes (hereinafter "is shifted") radially outward at a vertex portion by a distance d, subsequently extends toward the first slot $5_1$ circumferentially at a reverse angle of inclination θ, and is linked to a second rectilinear portion 10b in a second layer from the slot opening side of the first slot $5_1$. Next, a second coil end portion 10f that extends outward at a first axial end from the second rectilinear portion 10b in the second layer from the slot opening side of the first slot $5_1$ extends toward the second slot $5_2$ circumferentially at an angle of inclination θ, is shifted radially outward at a vertex portion by a distance d, subsequently extends toward the second slot $5_2$ circumferentially at a reverse angle of inclination θ, and is linked to a third rectilinear portion 10c in a third layer from the slot opening side of the second slot $5_2$.

Next, a third coil end portion 10g that extends outward at the second axial end from the third rectilinear portion 10c in the third layer from the slot opening side of the second slot $5_2$ extends toward the third slot $5_3$ circumferentially at an angle of inclination θ, is shifted radially outward at a vertex portion by a distance d, subsequently extends toward the third slot $5_3$ circumferentially at a reverse angle of inclination θ, and is linked to a fourth rectilinear portion 10d in a fourth layer from the slot opening side of the third slot $5_3$.

Next, a linking portion 11 that extends outward at the first axial end from the fourth rectilinear portion 10d in the fourth layer from the slot opening side of the third slot $5_3$ extends toward the second slot $5_2$ circumferentially at an angle of inclination θ, is shifted radially outward at a vertex portion by a distance d, subsequently extends toward the second slot $5_2$ circumferentially at a reverse angle of inclination θ, and is linked to a first rectilinear portion 10a in a fifth layer from the slot opening side of the second slot $5_2$. A first coil end portion 10e that extends outward at the second axial end from the first rectilinear portion 10a in the fifth layer from the slot opening side of the second slot $5_2$ extends toward the first slot $5_1$ circumferentially at an angle of inclination θ, is shifted radially outward at a vertex portion by a distance d, subsequently extends toward the first slot $5_1$ circumferentially at a reverse angle of inclination θ, and is linked to a second rectilinear portion 10b in a sixth layer from the slot opening side of the first slot $5_1$.

Next, the second coil end portion 10f that extends outward at a first axial end from the second rectilinear portion 10b in the sixth layer from the slot opening side of the first slot $5_1$ extends toward the second slot $5_2$ circumferentially at an angle of inclination θ, is shifted radially outward at a vertex portion by a distance d, subsequently extends toward the second slot $5_2$ circumferentially at a reverse angle of inclination θ, and is linked to a third rectilinear portion 10c in a seventh layer from the slot opening side of the second slot $5_2$. Next, a third coil end portion 10g that extends outward at the second axial end from the third rectilinear portion 10c in the seventh layer from the slot opening side of the second slot $5_2$ extends toward the third slot $5_3$ circumferentially at an angle of inclination θ, is shifted radially outward at a vertex portion by a distance d, subsequently extends toward the third slot $5_3$ circumferentially at a reverse angle of inclination θ, and is linked to a fourth rectilinear portion 10d in an eighth layer (a radially outermost position) from the slot opening side of the third slot $5_3$.

Thus, the first rectilinear portion 10a in the first layer of the second slot $5_2$ and the second rectilinear portion 10b in the second layer of the first slot $5_1$ are linked by the first coil end portion 10e, the second rectilinear portion 10b in the second layer of the first slot $5_1$ and the third rectilinear portion 10c in the third layer of the second slot $5_2$ are linked by the second coil end portion 10f, and the third rectilinear portion 10c in the third layer of the second slot $5_2$ and the fourth rectilinear portion 10d in the fourth layer of the third slot $5_3$ are linked by the third coil end portion 10g, to constitute a δ-shaped coil pattern.

In addition, the first rectilinear portion 10a in the fifth layer of the second slot $5_2$ and the second rectilinear portion 10b in the sixth layer of the first slot $5_1$ are linked by the first coil end portion 10e, the second rectilinear portion 10b in the sixth layer of the first slot $5_1$ and the third rectilinear portion 10c in the seventh layer of the second slot $5_2$ are linked by the second coil end portion 10f, and the third rectilinear portion 10c in the seventh layer of the second slot $5_2$ and the fourth rectilinear portion 10d in the eighth layer of the third slot $5_3$ are linked by the third coil end portion 10g, to constitute a δ-shaped coil pattern.

Thus, a winding body 10 is configured by winding a conductor wire 9 into a first slot $5_1$, a second slot $5_2$, and a third slot $5_3$ that line up at an angular pitch of six slots circumferentially, so as to repeat for two iterations in a radial direction a δ-shaped coil pattern that is formed by inserting the conductor wire 9 so as to alternate an axial direction of insertion into the first slot $5_1$, the second slot $5_2$, and the third slot $5_3$, sequentially in order of the second slot $5_2$, the first slot $5_1$, the second slot $5_2$, and the third slot $5_3$.

The winding body 10 is configured by linking the two δ-shaped coil patterns using a linking wire 11 so as to be arranged into two layers in a radial direction. In other words, the winding body 10 is produced by winding the conductor wire 9 in such a way that the two δ-shaped coil patterns become continuous. The first through fourth rectilinear portions 10a, 10b, 10c, and 10d are housed in slots 5 that are shared by three winding bodies 10 such that the longitudinal directions of the long sides of the rectangular cross sections of the conductor wires 9 are oriented circumferentially so as to line up in single columns in a radial direction.

Forty-eight winding bodies 10 that are configured in this manner are arranged concentrically at a pitch of one slot to produce the winding assembly 7 that is shown in FIG. 11. At a second axial end of the winding assembly 7, a layer of first coil end portions 10e in which the first coil end portions 10e are arranged circumferentially at a pitch of one slot and a layer of third coil end portions 10g in which the third coil end portions 10g are arranged circumferentially at a pitch of one slot are arranged alternately in four layers in a radial direction to constitute first coil ends 6a. At a first axial end of the winding assembly 7, a layer of second coil end portions 10f in which the second coil end portions 10f are arranged circumferentially at a pitch of one slot and a layer of linking wires 11 in which the linking wires 11 are arranged circumferentially at a pitch of one slot are arranged alternately in three layers in a radial direction to constitute second coil ends 6b. End portions of the winding ends 10h each extend axially outward from a radially inner side of the second coil ends 6b, and are arranged circumferentially at a pitch of one slot, and end portions of the winding ends 10i each extend axially outward from a radially outer side of the second coil ends 6b, and are arranged circumferentially at a pitch of one slot.

Shapes of the winding ends 10h and 10i of the winding bodies 10 will now be explained using FIGS. 6 through 9. The winding ends 10h that extend outward near the second coil ends from the first rectilinear portions 10a in the first layer of the second slots $5_2$ are formed so as to extend toward the first slots $5_1$ circumferentially at an angle of inclination θ and be bent at vertex portions (intermediate positions between the first slots $5_1$ and the second slots $5_2$) to extend axially outward. The winding ends 10i that extend outward near the second coil ends 6b from the fourth rectilinear portions 10d in the eighth layer of the third slots $5_3$ are formed so as to extend toward the fourth slots $5_4$ circumferentially at an angle of inclination θ and be bent at vertex portions (intermediate positions between the third slots $5_3$ and the fourth slots $5_4$) to extend axially outward.

Thus, the circumferential positions of the end portions of the winding ends 10i that protrude axially outward from the winding bodies 10 in which the first rectilinear portions 10a are housed in the second slots $5_2$ align approximately with the circumferential positions of the end portions of the winding ends 10h that protrude axially outward from the winding bodies 10 in which the first rectilinear portions 10a are housed in the fourth slots $5_4$. In other words, the circumferential positions of the end portions that protrude axially outward from the winding ends 10i of first winding bodies 10 align approximately with the circumferential positions of the end portions that protrude axially outward from the winding ends 10h of second winding bodies 10 that are two pole pitches away.

Next, a connection method for the winding assembly 7 will be explained by allotting, for convenience, Slot Numbers 1, 2, etc., through 48 in circumferential order to the forty-eight slots 5 that are disposed circumferentially on the stator core 3.

Eight winding bodies 10 are first mounted into a slot group at Slot Numbers (1+6n), where n is a natural number that is greater than or equal to 0 and less than or equal to 7. Then, four winding bodies 10 that are arranged at a pitch of two magnetic poles among the eight winding bodies 10 are respectively connected in series to form small coil groups U11 and U12.

Next, eight winding bodies 10 are mounted into a slot group at Slot Numbers (2+6n). Then, four winding bodies 10 that are arranged at a pitch of two magnetic poles among the eight winding bodies 10 are respectively connected in series to form small coil groups U21 and U22.

Eight winding bodies 10 are mounted into a slot group at Slot Numbers (3+6n). Then, four winding bodies 10 that are arranged at a pitch of two magnetic poles among the eight winding bodies 10 are respectively connected in series to form small coil groups V11 and V12.

Next, eight winding bodies 10 are mounted into a slot group at Slot Numbers (4+6n). Then, four winding bodies 10 that are arranged at a pitch of two magnetic poles among the eight winding bodies 10 are respectively connected in series to form small coil groups V21 and V22.

Eight winding bodies 10 are mounted into a slot group at Slot Numbers (5+6n). Then, four winding bodies 10 that are arranged at a pitch of two magnetic poles among the eight winding bodies 10 are respectively connected in series to form small coil groups W11 and W12.

Next, eight winding bodies 10 are mounted into a slot group at Slot Numbers (6+6n). Then, four winding bodies 10 that are arranged at a pitch of two magnetic poles among the eight winding bodies 10 are respectively connected in series to form small coil groups W21 and W22.

Here, as shown in FIG. 12, crossover portions 12 are formed by bending each of the winding ends 10h radially outward near end portions thereof. These crossover portions 12 are led radially outward so as to pass axially outside the second coil ends 6b, and are joined to the end portions of the winding ends 10i that are positioned radially outside the winding ends 10h in question by TIG welding, etc. Twelve small coil groups U11, U12, U21, U22, V11, V12, V21, V22, W11, W12, W21, and W22 that are each configured by connecting in series four winding bodies 10 that are arranged at a pitch of two magnetic poles circumferentially around the stator core 3 are produced thereby.

Moreover, from a viewpoint of suppressing the occurrence of damage to insulating coatings on the conductor wires 9 when the winding ends 10h are bent in order to form the crossover portions 12, it is desirable to make a bending radius of the winding ends 10h greater than a thickness of the winding ends 10h in the direction of bending, i.e., the wire thickness d.

As shown in FIG. 13, the end portions of the winding ends 10h, which constitute first ends of the twelve small coil groups U11, U12, U21, U22, V11, V12, V21, V22, W11, W12, W21, and W22, are arranged at a pitch of one slot circumferentially around a radially inner side of a circular arc-shaped region 13 that extends in a circular arc shape circumferentially around the second coil ends 6b, and the end portions of the winding ends 10i, which constitute second ends, are arranged at a pitch of one slot circumferentially around a radially outer side of the circular arc-shaped region 13 of the second coil ends 6b. End portion regions of the winding ends 10h that are led radially outward so as to pass axially outside the second coil ends 6b (hereinafter "the crossover portions 12") are arranged at a pitch of one slot circumferentially around a C-shaped region that is positioned on opposite sides of the circular arc-shaped region 13 on which the end portions of the winding ends 10h and 10i of the twelve small coil groups U11, U12, U21, U22, V11, V12, V21, V22, W11, W12, W21, and W22 are arranged circumferentially.

Connection of the twelve small coil groups U11, U12, U21, U22, V11, V12, V21, V22, W11, W12, W21, and W22 is performed using the connecting member 20 in the circular arc-shaped region 13 in which the end portions of the winding ends 10h and 10i of the twelve small coil groups U11, U12, U21, U22, V11, V12, V21, V22, W11, W12, W21, and W22 are arranged circumferentially.

The connecting member 20 includes: a neutral point connecting plate 21; electric power supply coils 25 that are connected to electric power supply portions of the stator winding 6 for supplying electric power to the stator winding 6 from an external electric power supply; and crossover wires 26 that connect between same-phase small coil groups. First and second neutral point connecting busbars 22 and 23 are produced by applying punching and bending to steel sheets, as shown in FIG. 14. As shown in FIG. 15, the neutral point connecting plate 21 is produced by insert-molding the first and second neutral point connecting busbars 22 and 23 using an insulating resin 24. As shown in FIG. 16, the electric power supply coils 25 are produced by bending and shaping round wire made of copper, etc. As shown in FIG. 17, the crossover wires 26 are produced by bending and shaping round wire made of copper, etc., into an angular C shape that is constituted by: an extending portion 26a; and a pair of end portions that protrude perpendicularly from two ends of the extending portion 26a.

A crossover wire 26 is joined by TIG welding, etc., to the winding ends 10h and 10i that are end portions of the small coil groups U11 and U22, which are offset by 30 electrical degrees, to produce a U1-phase winding in which the small coil groups U11 and U22 are connected in series. A crossover wire 26 is joined by TIG welding, etc., to the winding ends 10h and 10i that are end portions of the small coil groups V11 and V22, which are offset by 30 electrical degrees, to produce a V1-phase winding in which the small coil groups V11 and V22 are connected in series. A crossover wire 26 is joined by TIG welding, etc., to the winding ends 10h and 10i that are end portions of the small coil groups W11 and W22, which are offset by 30 electrical degrees, to produce a W1-phase winding in which the small coil groups W11 and W22 are connected in series.

A crossover wire 26 is joined by TIG welding, etc., to the winding ends 10h and 10i that are end portions of the small coil groups U21 and U12, which are offset by 30 electrical degrees, to produce a U2-phase winding in which the small coil groups U21 and U12 are connected in series. A crossover wire 26 is joined by TIG welding, etc., to the winding ends 10h and 10i that are end portions of the small coil groups V21 and V12, which are offset by 30 electrical degrees, to produce a V2-phase winding in which the small coil groups V21 and V12 are connected in series. A crossover wire 26 is joined by TIG welding, etc., to the winding ends 10h and 10i that are end portions of the small coil groups W21 and W12, which are offset by 30 electrical degrees, to produce a W2-phase winding in which the small coil groups W21 and W12 are connected in series.

The neutral point connecting plate 21 is disposed above the second coil ends 6b, and the terminals 22a, 22b, and 22c of the first neutral point connecting busbar 22 are joined to the winding ends 10h and 10i of the small coil groups U12, V12, and W12 by TIG welding, etc. In addition, the terminals 23a, 23b, and 23c of the second neutral point connecting busbar 23 are joined to the winding ends 10h and 10i of the small coil groups U22, V22, and W22 by TIG welding, etc. As shown in FIG. 18, a first three-phase alternating-current winding 6A that is configured by wye-connecting the U1-phase winding, the V1-phase winding, and the W1-phase winding and a second three-phase alternating-current winding 6B that is configured by wye-connecting the U2-phase winding, the V2-phase winding, and the W2-phase winding are formed thereby. In addition, the electric power supply coils 25 are connected to the power supply terminals of the first and second three-phase alternating-current windings 6A and 6B by TIG welding, etc. Moreover, in FIGS. 3 and 4, the number 27 indicates weld portions.

The rotary electric machine 100 that is configured in this manner operates as an 8-pole 48-slot inner-rotor three-phase motor, for example.

Here, as shown in FIGS. 3 and 4, the two end portions of the angular C shapes of the crossover wires 26 are connected to the winding ends that protrude on an inner circumferential side of the small coil groups and the winding ends that protrude on an inner circumferential side, and the crossover wires 26 are disposed above the second coil ends 6b such that the extending portions 26a are inclined relative to the radial direction. Circumferential regions that are occupied by each of the crossover wires 26 are separated from each other in the circumferential direction. In other words, the circumferential regions that are occupied by each of the crossover wires 26 do not overlap with each other in the circumferential direction. Effects due to the circumferential regions that are occupied by the crossover wires 26 not overlapping with each other in the circumferential direction will now be explained in contrast to Patent Literature 1.

In Patent Literature 1, because the circumferential regions that are occupied by the transition parts overlap with each other, groups of extending portions of the transition parts that extend circumferentially are in a densely packed state, reducing air passages. In contrast to that, in the present rotary electric machine, because the circumferential regions that are occupied by the crossover wires 26 do not overlap with each other, groups of extending portions 26*a* of the crossover wires 26 are in a sparser state, increasing air passages. Consequently, external air can exchange heat with the stator 1 efficiently, improving cooling of the stator 1. Heat is thereby less likely to be confined inside the stator 1, suppressing temperature increases in the rotor 40.

Furthermore, in Patent Literature 1, if a cooling liquid is sprayed onto the crossover portions from radially outside, for example, the cooling liquid that is sprayed onto the extending portions of one transition part flows onto other extending portions where the circumferential regions overlap and are adjacent while flowing circumferentially along the first extending portion. The cooling liquid that is sprayed onto the crossover portions thereby spreads out circumferentially and radially through the groups of the extending portions of the crossover portions, and then flows to the stator winding. The cooling liquid that flows to the stator winding flows along slot-housed portions (corresponding to the rectilinear portions in the present application) and return portions (corresponding to the coil end portions in the present application), and spreads out over the whole stator winding. Furthermore, the cooling liquid that is sprayed onto the coil ends that are constituted by the return portions flows along the slot-housed portions and the return portions, and spreads out over the whole stator winding.

Thus, in Patent Literature 1, the cooling liquid is sprayed onto the crossover wires and the coil ends. However, in Patent Literature 1, because the groups of extending portions of the crossover portions are in a densely packed state, the cooling liquid is not sprayed directly onto the rotor. Consequently, cooling liquid that has cooled the stator winding and risen in temperature is supplied for cooling of the rotor, preventing the rotor from being cooled effectively.

The present rotary electric machine 100 includes the cooling liquid supplying apparatus 120. Thus, when the pump 123 is driven, a cooling liquid such as ATF, etc., passes through the pipeline 121, and is sprayed onto the extending portions 26*a* of the crossover wires 26 and the second coil ends 6*b* from the discharging orifice 122. The cooling liquid that is applied to the extending portions 26*a* flows circumferentially and radially along the extending portions 26*a*, which are inclined relative to the radial direction, and flows to the stator winding 6. The cooling liquid that flows to the stator winding 6 flows along the rectilinear portions and the coil end portions and spreads out over the whole stator winding 6. Furthermore, the cooling liquid that is sprayed onto the second coil ends 6*b* flows along the slot-housed portions and the return portions, and spreads out over the whole the stator winding 6. The stator winding 6 is cooled thereby.

In addition, a portion of the cooling liquid passes through the gaps between the extending portions 26*a* of the crossover wires 26, flows toward the rotor 40, and is supplied for cooling of the rotor 40. Thus, because the cooling liquid that is supplied for cooling does not first cool the stator winding 6 and is not at high temperature, the rotor 40 can be cooled effectively. Furthermore, the cooling liquid that is supplied to the rotor 40 is scattered radially outward due to the rotation of the rotor 40. The stator winding 6 is thereby cooled from radially inside, improving the cooling of the stator winding 6.

Thus, according to Embodiment 1, the circumferential regions that are occupied by the crossover wires 26 that link together the winding ends of each of the small coil groups (windings) that are offset by 30 electrical degrees, in other words, among the plurality of windings, the conductor terminals of the windings through which same-phase electric power flows do not overlap with each other in the circumferential direction, as shown in FIGS. 3 and 4. Thus, wide gaps are formed between the extending portions 26*a* of the crossover wires 26, increasing passages for a refrigerant such as air, for example. Cooling of the stator 1 is thereby improved, suppressing temperature increases in the stator 1. Because heat is less likely to be confined inside the stator 1, the rotor 40 and external air can exchange heat efficiently, improving the cooling of the rotor 40.

Because temperature increases in the rotor 40 can be suppressed, demagnetization of the permanent magnets 43 that results from temperature increases in the rotor 40 can be suppressed. Consequently, because superior heat resistance is not required in the permanent magnets 43, inexpensive magnets that have low heat resistance, in which dysprosium (Dy) content is small, can be used as the permanent magnets 43, instead of expensive magnets that have a high dysprosium content and increased holding force.

Because the circumferential regions that are occupied by the crossover wires 26 do not overlap with each other in the circumferential direction, lengths of the crossover wires 26 are shorter than when the circumferential regions that are occupied by the crossover wires overlap with each other, reducing the use of material in the crossover wires 26, and enabling cost reductions and downsizing to be achieved. In addition, because sufficient distance can be ensured between the extending portions 26*a* of the crossover wires 26, electrical insulation between the crossover wires 26 is improved.

The crossover wires 26 and the winding ends 10*h* and 10*i* (the conductor terminals) are fixed using a welder chucking tool and then welded. In Embodiment 1, because the circumferential regions that are occupied by the crossover wires 26 do not overlap in the circumferential direction, the crossover wires 26 not being fixed are not in the way when inserting the chucking tool from axially outside, facilitating the fixing of the crossover wires 26 using the chucking tool, and improving productivity.

Because the crossover wires 26 are produced using round wire, which has a greater degree of shape freedom, productivity is improved.

The rotary electric machine 100 includes the cooling fans 44. Here, the cooling fans 44 rotate during rotation of the rotor 40, circulating air inside the housing 101. Heat exchange between the rotor 40 and external air is thereby activated, improving the cooling of the rotor 40. Because air passages are increased between the extending portions 26*a* of the crossover wires 26, the amount of air that passes through the gaps between the extending portions 26*a* of the crossover wires 26 is increased by circulating the air inside the housing 101, also improving cooling of the stator 1.

Because the rotary electric machine 100 includes the cooling liquid supplying apparatus 120, a cooling liquid such as ATF, etc., can be sprayed onto the extending portions 26*a* of the crossover wires 26 from radially outside. The cooling liquid that is sprayed onto the extending portions 26*a* spreads out circumferentially and radially along the extending portions 26*a* of the crossover wires 26 and flows toward the stator winding 6, and flows along the rectilinear portions and the coil end portions and spreads out over the whole stator winding 6. The stator winding 6 can thereby be cooled effectively.

In addition, a portion of the cooling liquid passes through the gaps between the extending portions 26*a* of the crossover wires 26, flows toward the rotor 40, and is supplied for cooling of the rotor 40. The rotor 40 can thereby be cooled effectively. Furthermore, the cooling liquid that is applied to the rotor 40 is scattered radially outward due to the rotation of the rotor 40. The stator winding 6 is thereby cooled from radially inside, improving the cooling of the stator winding 6.

Figure 19:
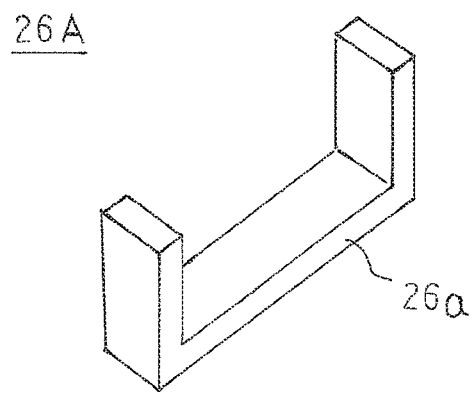
FIG. 19 is an oblique projection that shows a variation of the crossover wire in the rotary electric machine according to Embodiment 1 of the present invention.

Moreover, in Embodiment 1 above, the crossover wires 26 are produced using round wire, but crossover wires 26A may be produced using rectangular wire made of copper, etc., as shown in FIG. 19. If the crossover wires 26A are produced using rectangular wire, weld strength and welding reliability are increased because contact area between the joined conductor terminals is larger and the weld area is enlarged, improving vibration resistance and reliability of the weld portions, and enabling reductions in resistance to be achieved.

Embodiment 2

Figure 20:
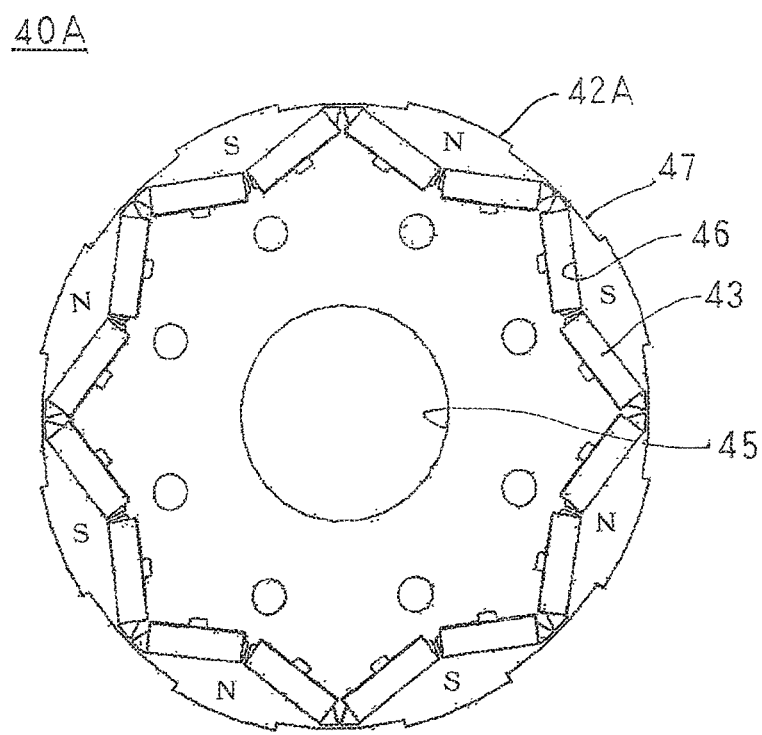
FIG. 20 is an end elevation that shows a rotor in a rotary electric machine according to Embodiment 2 of the present invention.

FIG. 20 is an end elevation that shows a rotor in a rotary electric machine according to Embodiment 2 of the present invention.

In FIG. 20, a rotor core 42A is produced into an approximately cylindrical body at a central position of which a shaft insertion aperture 45 is formed, by laminating and integrating electromagnetic steel sheets. Eight pairs of magnet insertion apertures 46 are each formed at a uniform angular pitch circumferentially so as to have aperture shapes that have identical rectangular cross sections, and so as to pass through axially near an outer circumferential side of the rotor core 42A. The pairs of magnet insertion apertures 46 are disposed in V shapes that open radially outward from a central axis of the rotor core 42A. In addition, eight rotor grooves 47 are each recessed into an outer circumferential surface of the rotor core 42A at a uniform angular pitch so as to extend from a first axial end to a second end of the rotor core 42A.

In addition, a permanent magnet 43 is inserted into and fixed to each of the magnet insertion apertures 46 to configure a rotor 40A. Permanent magnets 43 that are magnetized so as to have reverse polarity are inserted into adjacent pairs of the magnet insertion apertures 46 such that outer circumferential sides of the pairs of magnet insertion apertures 46 form salient poles. Thus, the rotor 40A has eight magnetic poles that differ alternately in a circumferential direction.

Moreover, Embodiment 2 is configured in a similar or identical manner to that of Embodiment 1 above except that the rotor 40A is used instead of the rotor 40.

Consequently, similar or identical effects to those of Embodiment 1 can also be achieved in Embodiment 2.

In Embodiment 2, the eight rotor grooves 47 that have groove directions in an axial direction are formed on an outer circumferential surface of the rotor core 42A at a uniform angular pitch, and indentations and protrusions are formed on the outer circumferential surface of the rotor core 42A. Thus, the indentations and protrusions on the outer circumferential surface of the rotor core 42A function as fans during rotation of the rotor 40A, circulating air inside the housing. Heat exchange between the rotor 40A and external air is thereby activated, improving the cooling of the rotor 40A. The amount of air that passes through the gaps between the crossover wires 26 is increased, improving cooling of the stator 1. In addition, the cooling fans 44 are no longer required, enabling cost reductions and downsizing of the rotary electric machine to be achieved.

Furthermore, when the cooling liquid supplying apparatus 120 is operated, the cooling liquid that has passed through the gaps between the crossover wires 26 and has flowed toward the rotor 40A is scattered radially outward by the indentations and protrusions on the outer circumferential surface of the rotor core 42A, and is supplied for cooling of the stator winding 6. Thus, the stator winding 6 is cooled from radially inside, improving the cooling of the stator winding 6.

Moreover, in each of the above embodiments, the winding bodies are produced using conductor wire that has a rectangular cross section (rectangular wire), but the cross section of the conductor wire that constitutes the winding bodies is not limited to a rectangular shape, and conductor wire that has a circular cross section (round wire) may be used, for example.

In each of the above embodiments, a first three-phase alternating-current winding is configured by wye-connecting the U1-phase winding, the V1-phase winding, and the W1-phase winding, and a second three-phase alternating-current winding is configured by wye-connecting the U2-phase winding, the V2-phase winding, and the W2-phase winding, but a first three-phase alternating-current winding may be configured by delta-connecting the U1-phase winding, the V1-phase winding, and the W1-phase winding, and a second three-phase alternating-current winding configured by delta-connecting the U2-phase winding, the V2-phase winding, and the W2-phase winding.

In each of the above embodiments, a U1-phase winding, a V1-phase winding, a W1-phase winding, a U2-phase winding, a V2-phase winding, and a W2-phase winding are each configured by connecting small coil groups in series, but a U1-phase winding, a V1-phase winding, a W1-phase winding, a U2-phase winding, a V2-phase winding, and a W2-phase winding may each be configured by connecting small coil groups in parallel.

In each of the above embodiments, a stator core on which forty-eight slots are disposed is used, but the total number of slots is not limited to forty-eight. Furthermore, the slots are formed at a ratio of two slots per phase per pole, but the number of slots per phase per pole is not limited to two, and may be one, or may be three or greater. In each of the above embodiments, the number of slots per phase per pole was two, and the spacing between the slots into which the rectilinear portions of the winding bodies are inserted was an angular pitch of six slots (a pitch of one magnetic pole), but if the number of slots per phase per pole is one, spacing between the slots into which the rectilinear portions of the winding bodies are inserted is an angular pitch of three slots (a pitch of one magnetic pole).

In each of the above embodiments, the winding bodies are constituted by full-pitch windings, but the winding bodies may be constituted by short-pitch windings or long-pitch windings.

In each of the above embodiments, winding bodies have been used in which two δ-shaped coil patterns that are arranged radially are formed continuously, but winding bodies may be formed using one δ-shaped coil pattern, or may be formed using three or more δ-shaped coil patterns that are arranged radially.

In each of the above embodiments, winding bodies have been used in which two δ-shaped coil patterns that are arranged radially are formed continuously, but the winding bodies are not limited to winding bodies in which two δ-shaped coil patterns that are arranged radially are formed continuously, provided that distributed winding bodies are disposed at a pitch of one slot so as to be equal in number to the number of slots in the stator core, and the winding start end portions of each of the winding bodies protrude axially outward from radially inside second coil ends, and winding finish end portions protrude axially outward from radially outside the second coil ends. For example, winding bodies may be used that are formed into a "hexagonal" coil pattern in which a conductor wire is wound helically for a plurality of turns.

In each of the above embodiments, winding bodies have been used in which two δ-shaped coil patterns that are arranged radially are formed continuously, but wave windings may be used, provided that the winding start end portions of the conductor wires protrude axially outward from radially inside second coil ends, and winding finish end portions protrude axially outward from radially outside the second coil ends.

In each of the above embodiments, an inner-rotor rotary electric machine in which a rotor is disposed on an inner circumferential side of a stator has been explained, but similar or identical effects can also be achieved if the present invention is applied to an outer-rotor rotary electric machine in which a rotor is disposed on an outer circumferential side of a stator.

What is claimed is:

1. A rotary electric machine comprising:
   a rotor that has a plurality of magnetic poles that differ alternately in a circumferential direction;
   an annular stator core that faces said rotor on an inner circumferential side or an outer circumferential side, and said annular stator core has slots that have a slot depth direction in a radial direction are arranged circumferentially; and
   a stator winding that is constituted by a plurality of conducting wires that are each wound onto said stator core so as to pass through said slots,
   wherein:
   conductor terminals of said plurality of conductor wires each extends outward at a first axial end of said stator core;
   among said conductor terminals, conductor terminals through which same-phase electric power flows are respectively connected by crossover wires; and
   said crossover wires are separated from each other in a circumferential direction.

2. The rotary electric machine according to claim 1, further comprising a cooling liquid supplying apparatus that sprays a cooling liquid onto said crossover wires.

3. The rotary electric machine according to claim 1, wherein said rotor includes a rotor core in which an outer circumferential surface is formed so as to have an indented surface.

4. The rotary electric machine according to claim 1, wherein said rotor includes a rotor core, and cooling fans are fixed to an axial end surface of said rotor core.

5. The rotary electric machine according to claim 1, wherein said conductor terminals and said crossover wires are joined together by welding.

6. The rotary electric machine according to claim 1, wherein said crossover wires are round wires.

7. The rotary electric machine according to claim 1, wherein said crossover wires are rectangular wires.

* * * * *